Dec. 1, 1936.    P. L. KELLER    2,062,789
PLANT GUARD
Filed May 7, 1936
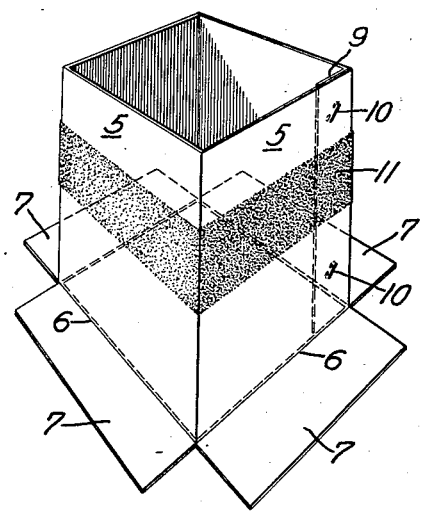
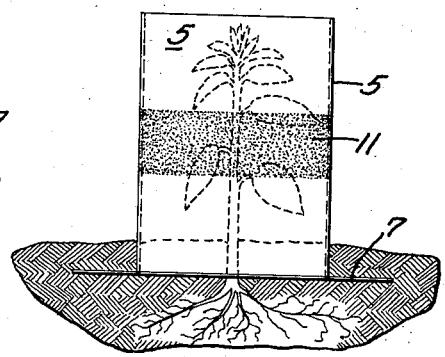
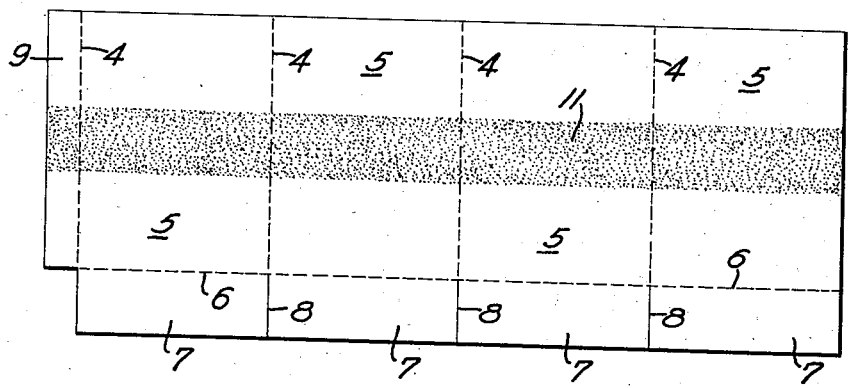
INVENTOR
Paul L. Keller
BY
Harry C. Schroeder
ATTORNEY Patented Dec. 1, 1936

2,062,789

UNITED STATES PATENT OFFICE 2,062,789

PLANT GUARD

Paul L. Keller, Concord, Calif.

Application May 7, 1936, Serial No. 78,303

1 Claim. (Cl. 47—30)

This invention relates to devices for protecting plants against the ravages of foliage eating insects of the crawling variety.

It is an object of the invention to provide means which will prevent caterpillars, slugs, sowbugs and other such insects from reaching plants.

Another object of the invention is to provide a device of the character described which will not lose its effectiveness regardless of the condition of the weather.

A further object of the invention is to provide an inexpensive plant protector which may be folded into a compact form thereby enabling a large quantity of them to be assembled into a small package.

Still another object of the invention is to provide a simple device of the character referred to which may be produced at very low cost.

The invention possesses other objects and valuable features, some of which, together with the foregoing will be specifically set forth in the detailed description of the preferred form of the invention hereunto annexed. It is to be understood that the invention is not to be limited to the particular species thereof shown and described, as various other embodiments thereof may be employed within the scope of the appended claim.

Referring to the drawing:

Figure 1 is a perspective view of the complete plant protector.

Figure 2 is a side elevational view of the plant guard showing the method of applying the guard to protect a plant.

Figure 3 is a plan view of the blank from which the protector is formed.

In detail, the protector is formed from the blank shown in Figure 3 which comprises a sheet of heavy paper impregnated with a suitable compound, such as bitumen, which will render it resistant to decay when placed in the ground, and is provided with a plurality of transverse scores 4 which divide the sheet into a plurality of panels 5, and with a longitudinal score 6 adjacent one edge which provides flanges 7, these latter being separated from each other by slits 8 extending from the ends of the scores 4. One transverse edge of the sheet is provided with a narrow tab 9.

The guard is formed by bending the sheet along each of the scores 4 and securing the tab 9, by means of staples 10, or in any other manner, to the opposite transverse edge of the sheet whereupon a rectangular tube will be formed as shown in Figure 1. The flanges 7 are bent outwardly to positions at right angles to the panels 5 as is also shown in the figure.

Either during the preparation of the sheet or after the guard has been assembled, a stripe 11 of a tacky non-hardening substance, such as grease, bird-lime, or the like, is applied longitudinally of the sheet as shown in Figure 3, or around the perimeter of the guard as shown in Figure 1. The substance of the stripe 11 may be any material, the principal requirements being that it be insoluble in water and incapable of drying out upon extended exposure to the air or sun.

The method of applying the guard to a plant is illustrated in Figure 2. It will be seen that the guard is placed to surround the plant and sufficient of the soil is removed so that the flanges 7 will be below the surface, whereupon when the removed soil is replaced the flanges will be buried and the guard will be rigidly held in upright position.

It will also be seen that crawling insects in attempting to reach the plant will start to climb up the sides of the panels 5, and will be prevented from proceeding farther by the barrier of sticky material. To provide for repelling certain of the insects the paper of which the guard is formed may be impregnated with creosote.

The guard lends itself to compact packaging in that it may be folded flat which permits a large number of the guards to be stacked and wrapped together. Such a procedure also serves to preserve the sticky material of the barrier since in the stack the barriers of adjacent guards will be in contact with each other, thereby preventing smearing of the substance or absorption thereof by the wrapper or box in which they may be packed.

It will be also seen that the cost of production of the guards above described is very low thereby permitting their sale at a very reasonable price.

I claim:

A plant guard comprising a sheet of material impregnated with a material for deterring decay, said sheet having opposite edges thereof joined together to provide a tubular member for surrounding a plant, portions of said sheet extending angularly from said member at one end thereof to provide flanges upon which material may be placed to secure said member to the ground about said plant, and a barrier against the passage of insects over the surface of said member, said barrier comprising a coating of a sticky substance on and encircling said member intermediate the ends thereof.

PAUL L. KELLER.